United States Patent [19]

Kurth

[11] Patent Number: 4,485,448
[45] Date of Patent: Nov. 27, 1984

[54] APPARATUS AND METHOD FOR DETECTING THE ONSET OF A FREQUENCY SHIFT KEYED SIGNAL

[75] Inventor: Richard R. Kurth, Sudbury, Mass.

[73] Assignee: Sperry Corporation, New York, N.Y.

[21] Appl. No.: 352,677

[22] Filed: Feb. 26, 1982

[51] Int. Cl.³ .............................................. H03D 3/06
[52] U.S. Cl. .................... 364/484; 324/78 F; 324/78 Q; 328/138; 329/145; 375/80
[58] Field of Search ............... 364/481, 484, 485, 550; 340/657, 658, 825.73, 825.74, 825.76, 351; 343/14, 17.2 R, 17.5; 375/80, 82, 88; 324/78 F, 78 Q; 328/138; 329/145

[56] References Cited

U.S. PATENT DOCUMENTS

| | | | |
|---|---|---|---|
| 3,372,335 | 3/1968 | Takada | 340/825.74 |
| 3,758,852 | 9/1973 | Nowell et al. | 340/658 |
| 3,866,124 | 2/1975 | Wycoff | 340/825.73 |
| 3,984,770 | 10/1976 | Chu | 364/484 |
| 4,024,414 | 5/1977 | Gurry | 364/484 |
| 4,203,113 | 5/1980 | Baghdady | 343/14 |
| 4,344,328 | 8/1982 | Hawkins | 364/484 |
| 4,349,878 | 9/1982 | Grimm | 364/484 |
| 4,363,138 | 12/1982 | Franklin et al. | 364/485 |
| 4,419,758 | 12/1983 | Dorey | 340/825.73 |
| 4,423,519 | 12/1983 | Bennett, Jr. et al. | 375/80 |

Primary Examiner—Jerry Smith
Assistant Examiner—Gary V. Harkcom
Attorney, Agent, or Firm—Howard P. Terry

[57] ABSTRACT

An incoming signal is tested for the presence or onset of a frequency shift keyed (FSK) signal which alternates at a known rate between two unknown frequencies separated by a known frequency shift. The incoming signal is time delayed an odd multiple of the keying period and the delayed signal is multiplied by the incoming signal to produce sum and difference frequencies when the FSK signal is present. The difference frequency is selected by filtration and multiplied by a time delayed version of itself to produce a steady phase signal. The steady phase signal is extracted by filtration, demodulated and integrated to produce a useable detector signal for comparison with a threshold level.

22 Claims, 11 Drawing Figures

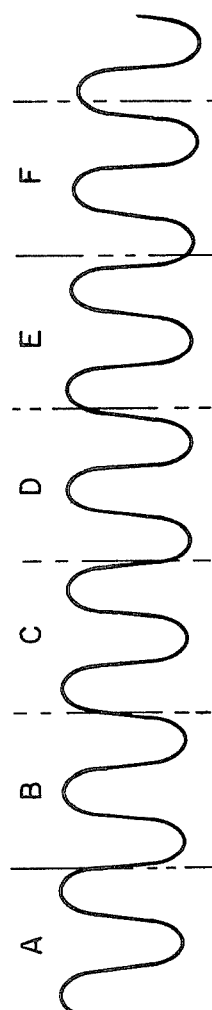
FIG.1P.
FIG.1Q.
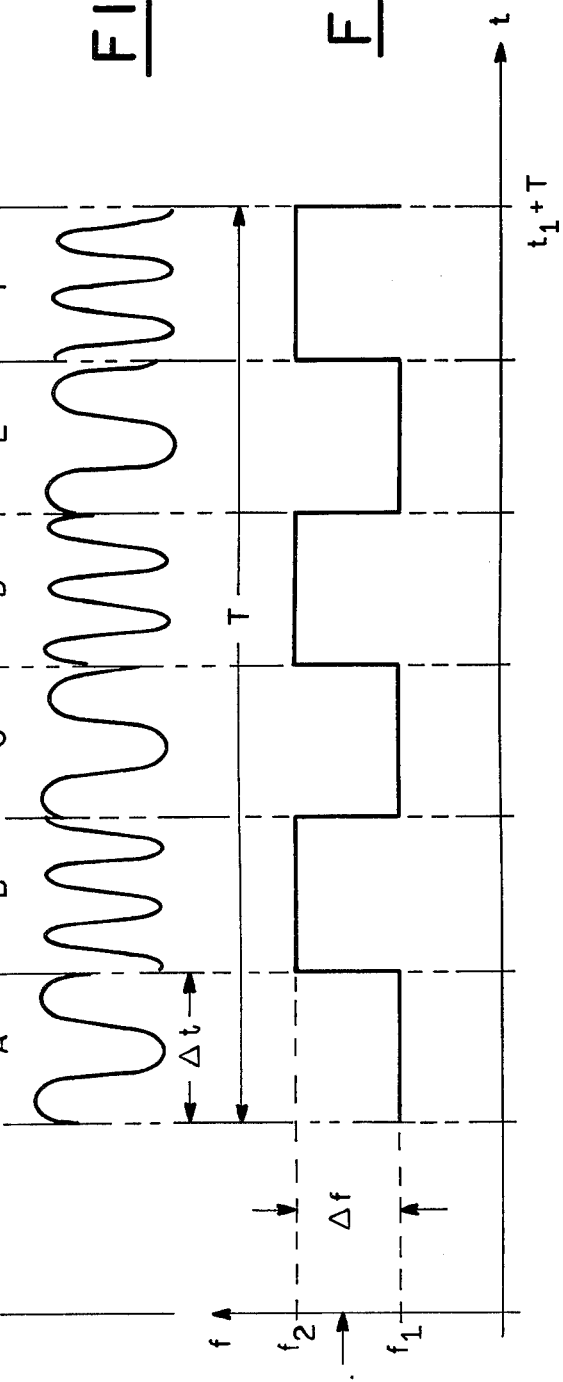
FIG.1R.
FIG.2.

APPARATUS AND METHOD FOR DETECTING THE ONSET OF A FREQUENCY SHIFT KEYED SIGNAL

BACKGROUND OF THE INVENTION

1. Field of the Invention

This invention relates to digital communication systems, and in particular to an apparatus and method for detecting the onset or presence of a frequency-shift-keyed (FSK) signal which alternates regularly between two unknown frequencies with an approximately known key rate.

2. Description of the Prior Art

Frequency shift keying is one way of communicating or transmitting binary data in which a sinusoidal carrier switches or alternates between two predetermined frequencies. This may be accomplished, for example, by frequency modulating one sine wave oscillator or by switching between two oscillators. In the latter case the two oscillators may be locked in phase, in which case there is said to be phase coherence between successive pulses of each frequency; or the oscillators may not be locked in phase in which case the successive pulses of each frequency are said to be non-coherent. Pulses transmitted at the two frequencies may alternate regularly at which is called the shift rate or key rate to produce a simple FSK signal. In either case the alternating frequencies can be considered as deviating equally above and below an average, center, or carrier frequency with a total frequency deviation referred to herein as the frequency shift or shift frequency.

Frequency-shift-keyed communication signals may be used in communication systems to alert the start or end of a transmission or other events in the course of a transmission such as a change in data format, to synchronize remote equipment, or to transmit data. Under these circumstances detection of the onset of such an FSK signal, either by a communications receiver or by an intercept receiver, is a necessary system function.

In some situations, the transmission carrier frequency of the FSK signal may not be precisely known at the receiver due to doppler shift, for example, or due to drift or wandering of the carrier frequency at the transmitter or due to lack of coordination among transmitter and receiver whether deliberate or not. Unknown carrier frequency makes the onset detection of these signals more difficult. For example, in a well known process known as synchronous detection the incoming signal, alternating between frequencies $f_1$ and $f_2$, is split into two signal paths. Each signal path is then multiplied by respective locally generated sine waves, one being the same frequency and phase as $f_1$, and the other the same as $f_2$. The resultant product terms are then passed through low pass filters to eliminate second harmonic terms. A shortcoming of the synchronous detection process is that the average carrier frequency and frequency shift, or frequencies $f_1$ and $f_2$, must be known a priori. Much drift or wandering of the carrier frequency significantly deteriorates system performance.

In another prior art detection scheme, known as non-coherent envelope detection, the incoming signal is split into two signal paths through a pair of narrow band filters, one filter centered at $f_1$ and the other filter centered at $f_2$. The outputs of the two filters are then individually envelope detected and compared to determine whether one binary symbol or the other was transmitted. Again the same shortcoming is evident. If the incoming frequencies drift or wander outside the filter pass bands, no signal will be detected.

One method has been proposed for detecting the onset of a signal of this type which takes advantage of the fact that any doppler shift or frequency wandering will equally affect both $f_1$ and $f_2$. While the carrier frequency may be unknown, the frequency shift and key rate are still known. The prior art technique uses a digital computer and the well known fast Fourier transform algorithm (FFT) or an analog spectrum analyzer, for example, to transform the incoming signal into the Fourier coefficients of its frequency spectrum. The computer then searches this spectrum for coincidences of signal which are separated by the frequency shift. One disadvantage of this system is that it requires a rather large computer and considerably memory space. Another is that it is not fully discriminating, Vis-a-Vis two simultaneous continuous wave tones, for example.

One effective solution of these problems is presented in U.S. Pat. No. 4,423,519 entitled "Apparatus and Method for Detecting the Onset of a Frequency Shift Keyed Signal", issued to C. L. Bennett and R. L. Price on Dec. 27, 1983 and assigned to Sperry Corporation. The present invention retains the advantages of the Bennett and Price invention with greatly improved performance.

SUMMARY OF THE INVENTION

The present invention embraces a method of and apparatus for detecting a frequency shift keyed signal of known frequency shift and key rate. The invention comprises multiplying the incoming signal by a delayed version of the incoming signal, the delay being approximately an odd multiple of the reciprocal of the key rate. This yields signals at the sum and difference frequencies which are then filtered through a bandpass filter centered at the shift frequency, and having a bandwidth approximately equal to the key rate. The bandpass filter passes only the difference frequency component which is centered at the shift frequency. The filtered difference version is multiplied by a component of itself which has been delayed by an odd multiple of the reciprocal of the key rate. This product is then filtered through a bandpass filter centered at twice the shift frequency with a bandwidth inversely proportional to the effective coherent integration interval. After the second filtration, the signal is demodulated or envelope detected, integrated, and then compared against a threshold signal to produce a report signal when an incoming FSK signal is present.

For a further understanding of the invention and its advantages over the prior art, reference is made to the following detailed description and the drawings.

BRIEF DESCRIPTION OF THE DRAWINGS

FIGS. 1P–1R show a typical frequency shift keyed (FSK) waveform as might be detected by the invention.

FIG. 2 is another representation of the FSK waveform.

DESCRIPTION OF THE PREFERRED EMBODIMENT

The present invention is uniquely adapted to detect the onset of a frequency shift keyed (FSK) signal. FIG. 1R shows an FSK signal wherein amplitude is plotted along the ordinate and time along the abscissa. The signal alternates between a first frequency $f_1$ and a second frequency $f_2$ during regular shift period intervals $\Delta t$ at a rate known as the key rate or shift rate $1/\Delta t$. The frequency $f_2$ may be considered as the sum of frequency $f_1$ plus a shift frequency $\Delta f$, i.e., $\Delta f = f_2 - f_1$. This shift frequency, also referred to herein as the frequency shift, is shown more clearly in FIG. 2, wherein frequency is plotted along the ordinate. Since the carrier frequency alternates between two distinct values, it is often convenient to refer to the average carrier frequency, $f_{avg}$, of the FSK signal, wherein $f_{avg} = f_1 + \Delta f/2$. The FSK signal of FIG. 1R may be considered as the composite of FIGS. 1P and 1Q, alternating at regular intervals, A, B, C ..., F, between a first frequency $f_1$ and a second frequency $f_2$. In FIG. 1R the unprimed intervals, A, C, and E, correspond to the waveform of FIG. 1P and the primed intervals, B', D', and F', correspond to the waveform of FIG. 1Q. The resultant composite waveform of FIG. 1R thus exhibits phase coherence from primed interval to primed interval, or from unprimed interval to unprimed interval. However, the composite signal does not in the general case, exhibit overall coherence since the function may be discontinuous every $\Delta t$ seconds by virtue of the frequency alternation. Those skilled in the art will recognize that there are certain special cases within the general case of FIG. 1R which exhibit overall phase coherence. The present invention is applicable to both the special and general cases. For purposes of describing the invention, the FSK signal of FIG. 1R is assumed to begin at arbitrary time $t_1$ and end at time $t_1 + T$, where T represents the duration of the FSK signal. In FIG. 1, the signal comprises six successive pulses of alternating frequencies, however, it will be understood that any number N of frequency shifts are contemplated by the invention, wherein N is defined so that $T = N\Delta t$, and that N need not be known a priori.

Figure 3:
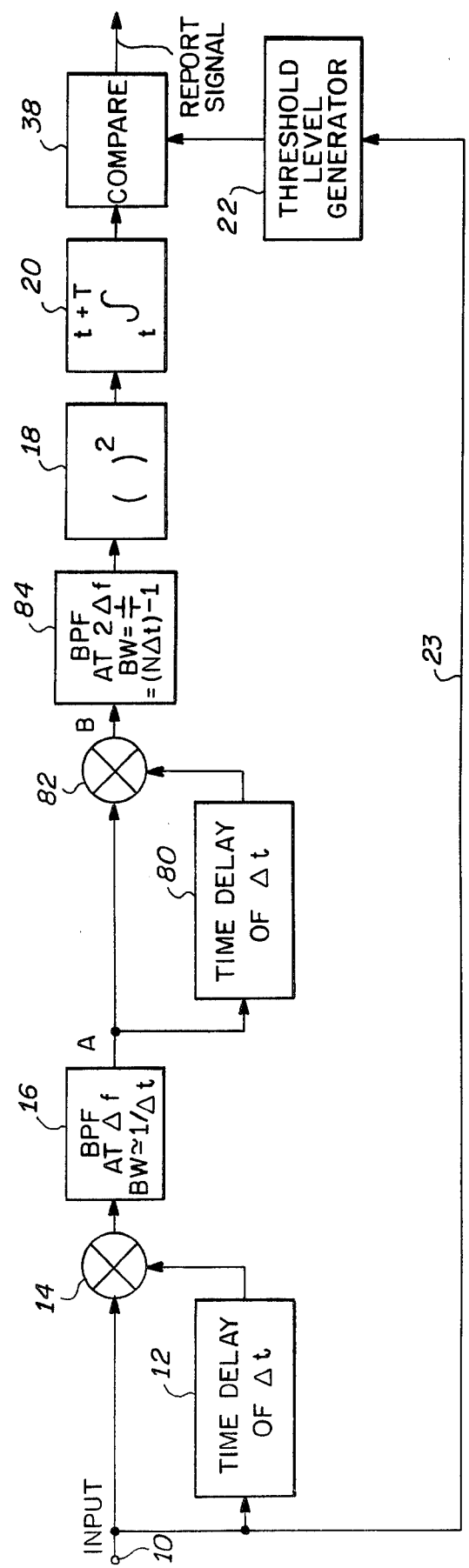
FIG. 3 is a block schematic diagram of the preferred embodiment of the improved FSK detector.

The presently preferred embodiment of the invention is shown in FIG. 3. The embodiment is suitable to detect FSK signals of the general case exemplified by FIG. 1R in which every other interval is phase coherent. Overall phase coherence of the composite waveform is not required, although it may be present. The embodiment comprises an input port 10 into which an incoming signal may be introduced. The incoming signal is applied to a first time delay device 12 which is adapted to delay the incoming signal by an odd multiple of the key period $\Delta t$. The time delay device 12 may be, for instance, an analog delay device, or a shift register interfaced with an A/D converted in the usual fashion. One analog delay device, especially useful at very high key rates, is a surface acoustic wave (SAW) delay line. In the presently preferred embodiment, the incoming signal is delayed in delay device 12 by approximately the unity multiple of the key period $\Delta t$. It will become apparent to those skilled in the art that this first delay might be any odd multiple of the key period, provided it does not exceed the duration T of the incoming FSK signal. For most applications, the unity multiple yields greatest sensitivity. The first time delay signal and the incoming signal are multiplied together in a first multiplier 14. The output product of multiplier 14 is applied to a first bandpass filter 16 having a passband centered at the shift frequency $\Delta f$. In this first preferred embodiment, the bandwidth of bandpass filter 16 is approximately equal to the key rate $1/\Delta t$. While use of a bandpass filter is presently preferred for its ability to reject noise frequencies outside the passband, it will be understood that a low pass filter adapted to pass the shift frequency $\Delta f$ might alternatively be employed.

The filtered signal from bandpass filter 16 is applied to a second time delay device 80 which is adapted to delay the filtered signal by approximately an odd multiple of the key period $\Delta t$. The output of time delay device 80 and the output of bandpass filter 16 are multiplied together in a second multiplier 82. The output product of multiplier 82 is applied to a second bandpass filter 84, which has a pass band centered at twice the shift frequency $2\Delta f$. The bandwidth of bandpass filter 84 is inversely proportional to the effective coherent integration interval of $N'\Delta t = T'$. where N' is a design variable in the range $1 \leq N' \leq N$. The filtered signal from bandpass filter 84 is then applied to an envelope detector or demodulator 18 which may be, for example, any well known non-linear device such as a square law detector. The demodulated signal is applied to an integrator 20 which integrates the demodulated signal noncoherently over a duration up to T, the duration of the anticipated FSK signal. The integrator 20 provides an output signal, or detector signal, for comparison to a threshold level in order to determine the presence or absence of an FSK signal. The threshold level may be generated by any well known threshold level generator 22. The threshold level may be simply a constant D.C. voltage, for example, or it may be a variable level referenced to the incoming signal. In the latter case the threshold level generator 22 is preferably coupled to the input port 10 as by lead 23.

The output of theshold level generator 22 and the output integrator 20 are coupled to a comparator 38 which produces a report signal when the output of integrator 20 exceeds the threshold level.

While the foregoing preferred embodiment has been described in terms of a block diagram, those skilled in the art will recognize that the blocks may be implemented using analog devices, or digital devices. In the latter case the incoming signal may be suitably sampled and digitally quantized. In this case the delays can be implemented by shift registers or other forms of digital memory. Digital filters implemented with arithmetic circuits can provide the bandpass frequency selectivity required.

Figure 4A:
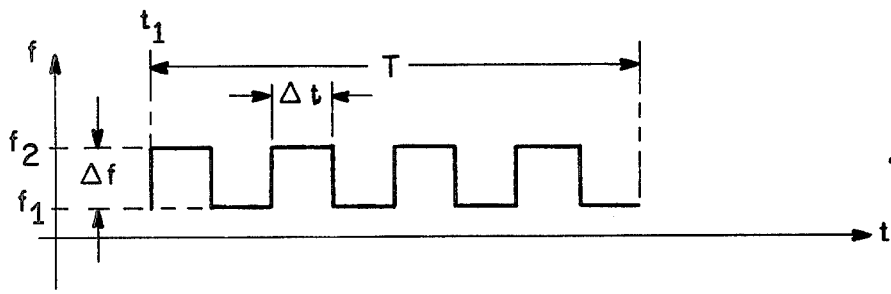
FIGS. 4A–4F are a series of waveforms useful in describing the operation of the invention.
Figure 4B:
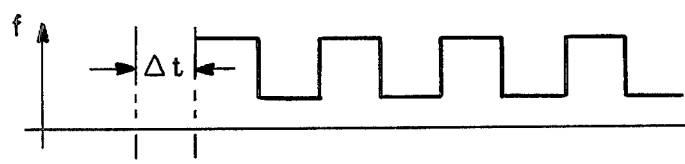
Figure 4C:
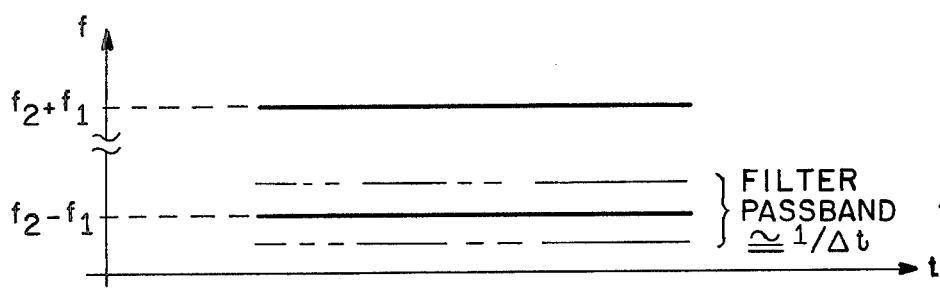
Figure 4D:
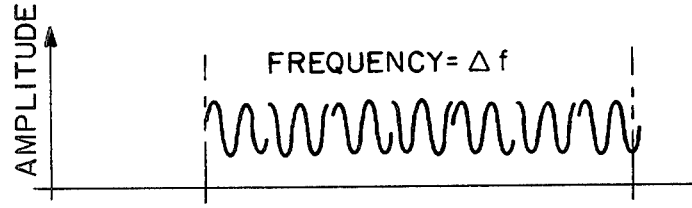
Figure 4E:
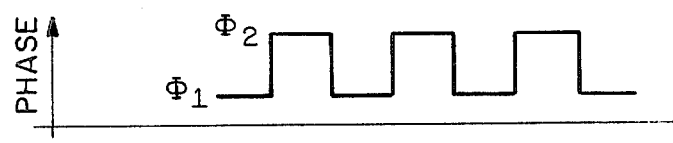
Figure 4F:
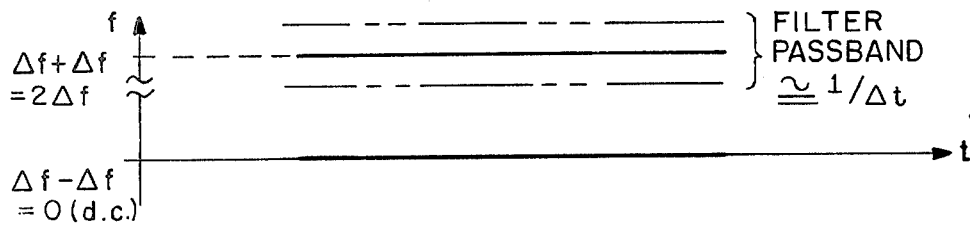

For an understanding of the operation of the invention, refer to FIGS. 4A–4F of the drawings. An incoming FSK signal beginning at time $t_1$ and ending at time $t_1 + T$ is shown in FIG. 4A. The incoming FSK signal of FIG. 4A is applied to the first time delay device 12 which time delays the waveform by a period $\Delta t$. The shifted waveform, shown in FIG. 4B is multiplied by the incoming waveform to produce the sum and difference frequencies shown in FIG. 4C. In this regard, recall the trigonometric identity $(\cos f_1)(\cos f_2) = \frac{1}{2}\cos(f_2 - f_1) + \frac{1}{2}\cos(f_2 + f_1)$. Also recall that the difference frequency $(f_2 - f_1)$ is, in fact, the shift frequency $\Delta f$. Because the bandpass filter 16 is centered at $\Delta f$, this difference frequency is passed through the filter, whereas the sum frequency $(f_2 + f_1)$ is rejected. Also rejected is a great deal of noise at frequencies outside the filter passband. The filtered difference frequency signal is a sequence of sinusoidal pulses, all at the frequency Δf and of duration Δt, but possibly shifting in phase from pulse to pulse. FIGS. 4D and 4E depict the filtered difference signal. In FIG. 4D signal amplitude is plotted along the abscissa and time along the ordinate, and in FIG. 5E its phase difference with respect to a hypothetical reference sinusoid having zero phase angle at t=0 is plotted along the abscissa and time along the ordinate. The filtered difference signal of FIGS. 4D and 4E is applied to the second time delay device 80 which time delays the waveform by period Δt. The time shifted waveform is multiplied by the undelayed filtered difference signal to produce the sum and difference frequencies shown in FIG. 4F. Since the time delayed signal of FIG. 4D is of a single frequency Δf, the product of multiplier 82 includes a component at 2Δf and a component at 0 or d.c. The second bandpass filter 84 passes the 2Δf component which has a phase that is constant over multiple Δt intervals as a consequence of the phase coherence depicted in FIGS. 1 P-R. Hence, it can be integrated coherently for longer than Δt. By selecting the bandwidth of bandpass filter 84 to be 1/T', that is, $(N'\Delta t)^{-1}$, coherent integration is effected over a duration exceeding Δt and possibly up to the duration of the FSK signal. It will be appreciated that this relatively long coherent integration interval greatly improves system performance by enhancing the signal-to-noise ratio. Next the signal is envelope detected in demodulator 18 to remove the unknown but constant phase from the sinusoidal filtered sum component 2Δf to produce a logical high signal when the FSK signal is present, and a logical low signal otherwise. These logical states are then integrated by integrator 20 and tested by comparator 38 against the threshold generated by threshold level generator 22 to produce a report signal when the FSK signal is present.

As an aid in further explaining the operating principles of the present invention, mathematical descriptions of the signals at various points in the circuit are provided below. The incoming waveform shown in FIG. 1R allternates between two sinusoidal components.

$$\cos[2\pi(f_1+\Delta f)t+\phi] \quad (1)$$

and $$\cos[2\pi f_1 t+\psi] \quad (2)$$

every Δt seconds. In equations (1) and (2) a unit amplitude is used for convenience of description.

Because the argument of each of these components is a continuous function of time, they are said to be coherent. However, the composite signal of FIG. 1 is itself not coherent in this sense, since the argument of the cos (.) function generally exhibits a discontinuity every Δt seconds, by virtue of the tone alternation.

The presently preferred embodiment shown in FIG. 3 employs first time delay device 12 and second time delay device 80, each providing an approximate time delay Δt', corresponding to the tone duration Δt of the signal being detected. In practice, these time delay devices need not be precisely equal to the actual signal, nor must they be precisely equal to one another. Therefore, for purposes of this mathematical description the notation Δt' and Δt" is used to indicate that the two delay elements need not be precisely equal to the signal Δt of FIG. 1R.

During the Δt interval of time denoted by A in FIG. 1R, the output of the first multiplier 14 is $$r(t)\,r(t-\Delta t')\,\Big|_A = \tfrac{1}{2}\cos[2\pi\Delta f t - 2\pi(f_1+\Delta f)\Delta t' + \phi - \psi] + \quad (2a)$$

$$\tfrac{1}{2}\cos[2\pi(2f_1+\Delta f)t - 2\pi(f_1+\Delta f)\Delta t' + \phi + \psi]$$

During the interval marked B' in FIG. 1R, the first multiplier output becomes $$r(t)\,r(t-\Delta t')\,\Big|_{B'} = \tfrac{1}{2}\cos[2\pi\Delta f t + 2\pi f_1\Delta t' + \phi - \psi] + \quad (2b)$$

$$\tfrac{1}{2}\cos[2\pi(2f_1+\Delta f)t - 2\pi f_1\Delta t' + \phi + \psi]$$

During the interval C, the multiplier output returns to the functional form given in (2a). Thus the multiplier 14 output signal alternates regularly between (2a) and (2b). This analysis ignores a very small interval occurring every Δt seconds during which the multiplier outputs are not given by (2) whenever the implemented delay Δt' differs slightly from the true Δt. This anomaly has no important effect on the operation of the invention.

The first terms in (2a) and (2b) are components at the difference frequency Δf (by virtue of the 2πΔft linearly progressing phase component in each argument), whereas the second terms are at the sum frequency, $2f_1+\Delta f$. Hence only the difference frequency components are passed by the first bandpass filter 16, which has its passband located at Δf. At point X in FIG. 3, then, the response to the FIG. 1R input is a regular alternation between $$\cos[2\pi\Delta ft - 2\pi(f_1+\Delta f)\Delta t' + \phi - \psi] \quad (3a)$$

and $$\cos[2\pi\Delta ft + 2\pi f_1\Delta t' + \phi - \psi] \quad (3b)$$

every Δt seconds. The inconsequential fixed amplitude scale factor and phase shift introduced by the bandpass filter have not been included in this analysis.

From (3a) and (3b) it is evident that during intervals Δt seconds long, the signal at point X in FIG. 3 is a steady sinusoid of frequency Δf with a constant phase component which alternates regularly between the values $$-2\pi(f_1+\Delta f)\Delta t'+\phi-\psi \quad (4a)$$

and $$2\pi f_1\Delta t'+\phi-\psi \quad (4b)$$

every Δt seconds.

In order to be able to integrate the signal at point X coherently for more than Δt seconds, and thereby improve detection performance, it is necessary that this Δf sinusoidal component have a stable constant phase component for longer than Δt. The time delay devive 80, multiplier 82, and bandpass filter 84 effectively enable coherent integration for an extended period of time.

With continued reference to FIG. 3, we see that the point X waveform is multiplied by a delayed version of itself in the second multiplier 82. The second delay Δt" is nominally equal to the shift period Δt of the incoming signal. Since both inputs to the second multiplier 80 have a frequency $\Delta f$, the multiplier output has components at $2\Delta f$ (sum) and d.c. (difference). The second bandpass filter 84 passes the sum component at $2\Delta f$.

If we denote the ideal signal at point X as $s_{3a}(t)$ or $s_{3b}(t)$ according to (3a) or (3b), respectively, then the $2\Delta f$ component Y during time interval A is $$s_{3b}(t - \Delta t'')s_{3a}(t) \Big|_{A, 2\Delta f \text{ component}} = \cos[2\pi(2\Delta f)t - 2\pi\Delta f(\Delta t' + \Delta t'') + 2(\phi - \psi)] \quad (5a)$$

During the following $\Delta t$-second interval B', the sum component at point Y is $$s_{3a}(t - \Delta t'')s_{3b}(t) \Big|_{B', 2\Delta f \text{ component}} = \cos[2\pi(2\Delta f)t - 2\pi\Delta f(\Delta t' + \Delta t'') + 2(\phi - \psi)] \quad (5b)$$

Clearly (5a) and (5a) are identical, so that at point Y the ideal signal is a sinusoid at a frequency $2\Delta f$ with a constant phase component which remains steady over multiple $\Delta t$ intervals. Hence the sinusoid can be integrated coherently for longer than $\Delta t$. This is accomplished by the second bandpass filter 80 which has a bandwidth $(N'\Delta t)^{-1}$ inversely proportional to its effective coherent integration time constant, $N'\Delta t$, where $N'$ is a parameter of the detector.

The second delay-multiplier-filter structure of FIG. 3 exploits the alternating constant phase component of the ideal signal at point X by extracting the sum component of the product. The delay $\Delta t''$ insures that the differently phased sinusoids (3a) and (3b) will both be present at multiplier inputs. As their constant phase components switch back and forth, that of the sum frequency term of the multiplier output nevertheless remains steady.

Note from (5) that only $\Delta f$ and $\Delta t$ need be known approximately by the detector and not the carrier frequency $f_{avg}$. Also note that $\Delta t'$ and $\Delta t''$ need only be approximately equal to $\Delta t$ to take full advantage of the potential gain of integration against noise. The precise value of the constant phase component $2(\phi - \psi)$ in (5) is not critical to the detection function, only its steadiness. If $\Delta f$ and the original tone phase difference $\phi - \psi$ are quite accurately known, then the phase of (5) can be considered as known, assuming that $\Delta t'$ and $\Delta t''$ are known to sufficient accuracy. In this case, modification of the envelope detector 18 could provide some additional gain in detection performance.

It will be understood that in the foregoing embodiment of the invention the input signal 10 may be prefiltered to eliminate those frequencies known not to contain the desired FSK signal. In this manner the effects of extraneous signals, interference, or noise, may be suppressed. Furthermore, it will be recognized that hard limiting one or both multiplier inputs may reduce the complexity of the threshold level generator circuitry 22 by providing an automatic constant false alarm feature.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. An apparatus for detecting the presence in an incoming signal of a frequency-shift-keyed signal of known shift frequency, key rate, and key period that comprises means for dividing the incoming signal to produce two identical incoming signals;

first means for time delaying one of the identical incoming signals by a first time interval and for providing a first time delayed signal;

first means for multiplying the other identical incoming signal by the first time delayed signal to produce a first product;

first means for filtering the first product to pass a first filtered signal of frequency substantially equal to the shift frequency;

dividing the first filtered signal to produce two identical first filtered signals;

second means for time delaying one of the identical first filtered signals by a second time interval to produce a second time delayed signal;

second means for multiplying the other identical first filtered signal by the second time delayed signal to produce a second product;

second means for filtering the second product to pass a second filtered signal of frequency substantially equal to twice the shift frequency;

means for producing a threshold signal for comparison with the second filtered signal;

means for providing a report signal indicating the presence of the frequency-shift-keyed signal when the second filtered signal exceeds the threshold signal; and means for producing no report signal indicating the absence of the frequency-shift-keyed signal when the second filtered signal does not exceed the threshold signal.

2. The apparatus according to claim 1 wherein the first time delaying means is adapted to produce a time delay substantially equal to an odd multiple of the key period.

3. The apparatus according to claim 1 wherein the second time delaying means is adapted to produce a time delay substantially equal to an odd multiple of the key period.

4. The apparatus according to claim 1 wherein the first filtering means comprises a bandpass filter having a passband centered at substantially the shift frequency.

5. The apparatus according to claim 1 wherein the second filtering means comprises a bandpass filter having a passband centered substantially at twice the shaft frequency.

6. The apparatus according to claim 1 wherein the first filtering means comprises a bandpas filter whose passband is substantially of width equal to the key rate.

7. An apparatus for detecting a frequency-shift-keyed signal as recited in claim 1, wherein the frequency-shift-keyed signal additional is of known finite duration and the second filtering means comprises a bandpass filter whose passband is of a width not less than the reciprocal of the known finite duration.

8. The apparatus according to claim 1 that further comprises means for demodulating the second filtered signal to produce a logical high signal if the frequency shift keyed signal is present and a logical low signal if the frequency shift keyed signal is absent.

9. The apparatus according to claim 8 wherein the demodulating means comprises means for envelope detecting the second filtered signal.

10. An apparatus for detecting a frequency shift keyed signal as recited in claim 1, wherein the frequency shift keyed signal additionally is of a known finite duration and the apparatus further comprises means for integrating the second filtered signal over an interal not less than the known finite duration.

11. The apparatus according to claim 1 wherein the means for producing a threshold signal comprises means for producing a threshold signal in response to the incoming signal.

12. The method of detecting the presence of an incoming signal of a frequency shift keyed signal of known shift frequency, key rate, and key period that comprises
  (a) dividing the incoming signal to produce two identical incoming signals,
  (b) time delaying one of the identical incoming signals by a first time interval to produce a first delayed signal;
  (c) multiplying the other identical incoming signal by the first delayed signal to produce a first product;
  (d) filtering the first product to pass a first filtered signal of frequency substantially equal to the shift frequency;
  (e) dividing the first filtered signal to produce two identical first filtered signals,
  (f) time delaying one of the identical first filtered signals by a second time interval to produce a second delayed signal;
  (g) multiplying the other identical first filtered signal by the second delayed signal to produce a second product;
  (h) filtering the second product to pass a second filtered signal of frequency substantially equal to twice the shift frequency;
  (i) producing a threshold signal for comparison with the second filtered signal;
  (j) producing a report signal indicating the presence of the frequency-shift-keyed signal when the second filtered signal exceeds the threshold signal;
  (k) producing no report signal indicating the absence of the frequency-shift-keyed signal when the second filtered signal does not exceed the threshold signal.

13. The method according to claim 12 wherein the first time interval is an odd multiple of the key period.

14. The method according to claim 12 wherein the second time interval is an odd multiple of the key period.

15. The method according to claim 12 wherein the step of filtering the first product comprises filtering the first product through a bandpass filter having a passband centered substantially at the shift frequency.

16. The method according to claim 12 wherein the step of filtering the second product comprises filtering the second product through a bandpass filter having a passband centered substantially at twice the shift frequency.

17. The method according to claim 12 that further comprises demodulating the second filtered signal to produce a logical high signal if the frequency-shift-keyed signal is present and a logical low signal if the frequency-shift-keyed signal is absent.

18. The method according to claim 17 wherein the demodulating step is performed by envelope detecting the second filtered signal.

19. The method according to claim 12 wherein the step of filtering the first product comprises filtering the first product through a bandpass filter whose passband is substantially of width equal to the key rate.

20. The method for detecting a frequency-shift-keyed signal as recited in claim 12, wherein the frequency-shift-keyed signal additionally is of a known finite duration and wherein the step of filtering the second product comprises filtering the second product through a bandpass filter whose passband is a width not less than the reciprocal of the known finite duration.

21. The method for detecting a frequency-shift-keyed signal as recited in claim 12, wherein the frequency-shift-keyed signal additionally is of a known duration and the method further comprises integrating the second filtered signal over an interval not less than the known finite duration.

22. The method according to claim 12 wherein the step of producing a threshold signal is performed by producing a theshold signal in response to the incoming signal.

* * * * *